(12) United States Patent
Lu et al.

(10) Patent No.: US 9,130,499 B2
(45) Date of Patent: *Sep. 8, 2015

(54) SYSTEM AND METHOD OF SPEED DETECTION IN AN AC INDUCTION MACHINE

(71) Applicant: Eaton Corporation, Cleveland, OH (US)

(72) Inventors: Bin Lu, Shanghai (CN); Santosh Kumar Sharma, Viman Nagar (IN); Ting Yan, Menomonee Falls, WI (US); Steven Andrew Dimino, Wauwatosa, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,614

(22) Filed: Sep. 10, 2013

(65) Prior Publication Data

US 2014/0009102 A1 Jan. 9, 2014

Related U.S. Application Data

(63) Continuation of application No. 12/816,461, filed on Jun. 16, 2010, now Pat. No. 8,566,056.

(51) Int. Cl.
*G01P 21/00* (2006.01)
*H02P 27/04* (2006.01)
(Continued)

(52) U.S. Cl.
CPC ............... *H02P 27/047* (2013.01); *G01P 3/48* (2013.01); *G01P 3/489* (2013.01); *H02P 23/14* (2013.01); *H02P 21/146* (2013.01)

(58) Field of Classification Search
CPC ........ H02P 21/14; H02P 21/146; H02P 23/14
USPC .......................................................... 702/96
See application file for complete search history.

(56) References Cited

U.S. PATENT DOCUMENTS

| 5,739,698 A | 4/1998 | Bowers et al. |
| 6,650,122 B2 | 11/2003 | Sullivan et al. |

(Continued)

OTHER PUBLICATIONS

Hurst et al., "Sensorless Speed Measurement Using Current Harmonic Spectral Estimation in Induction Machine Drives," IEEE Transactions on Power Electronics, vol. 11, No. 1, Jan. 1996, pp. 66-73.

(Continued)

*Primary Examiner* — Timothy H Hwang
(74) *Attorney, Agent, or Firm* — Ziolkowski Patent Solutions Group, SC (57) ABSTRACT

A system and method for determining rotor speed of an AC induction machine is disclosed. The system is programmed to estimate a rotor speed of the induction machine according to a linear speed estimation algorithm and based on name plate information (NPI) of the induction machine and parameters of the AC induction machine during operation thereof. The rotor speed estimation system is also programmed to estimate a rotor speed of the AC induction machine according to a frequency-domain signal processing algorithm and determine if the rotor speed estimated thereby is valid. If the rotor speed estimated by the frequency-domain signal processing algorithm is valid, then a tuned rotor speed of the AC induction machine is estimated according to the linear speed estimation algorithm and based, in part, on the rotor speed estimated by the frequency-domain signal processing algorithm.

20 Claims, 4 Drawing Sheets (51) Int. Cl.
*G01P 3/48* (2006.01)
*G01P 3/489* (2006.01)
*H02P 23/14* (2006.01)
*H02P 21/14* (2006.01)

(56) References Cited

U.S. PATENT DOCUMENTS

| | | |
|---|---|---|
| 7,184,902 B2 * | 2/2007 | El-Ibiary .................. 702/60 |
| 8,203,298 B2 | 6/2012 | Lu et al. |
| 2004/0054485 A1 * | 3/2004 | Dragomir-Daescu et al. .. 702/76 |
| 2008/0300827 A1 * | 12/2008 | Lu et al. .................. 702/182 |
| 2009/0108797 A1 | 4/2009 | Haas |
| 2009/0284204 A1 * | 11/2009 | Colby et al. .................. 318/490 |

OTHER PUBLICATIONS

Hurst et al., "A Comparison of Spectrum Estimation Techniques for Sensorless Speed Detection in Induction Machines," IEEE Transactions on Industry Applications, vol. 33, No. 4, Jul./Aug. 1997, pp. 898-905.

Yaskawa, E7 Drive User Manual, (Aug. 1, 2008).

Hurst et al., "A Self-Tuning, Closed-Loop Flux Observer for Sensorless Torque Control of Standard Induction Machines," Power Electronics Specialists Conference, 1995, 26th Annual IEEE, Atlanta, GA, Jun. 18-22, 1995, New York, NY, IEEE, vol. 2, Jun. 18, 1995, pp. 792-798.

Cowern, "Understanding Induction Motor Nameplate Information," http://ecmweb.com/print/motors/understanding-induction-motor-nameplate-information, May 1, 2004, pp. 1-6.

\* cited by examiner

SYSTEM AND METHOD OF SPEED DETECTION IN AN AC INDUCTION MACHINE

CROSS-REFERENCE TO RELATED APPLICATION

The present application is a continuation of, and claims priority to, U.S. non-provisional application Ser. No. 12/816,461, filed Jun. 16, 2010, the disclosure of which is incorporated herein by reference.

BACKGROUND OF THE INVENTION

The present invention relates generally to AC induction machines and, more particularly, to a system and method for determining rotor speed of an AC induction machine.

Electric motors consume a large percentage of generated electricity capacity. Many applications for this "workhorse" of industry are fan and pump industrial applications. For example, in a typical integrated paper mill, low voltage and medium voltage motors may comprise nearly 70% of all driven electrical loads. Due to the prevalence of these motors in industry, it is paramount that the electric motors be operated reliably and efficiently. Motor design parameters and performance parameters are often required by motor management systems to optimize the control and operations of electric motors. Similarly, motor status monitoring enables the electric motors to operate reliably. Many motor status monitoring techniques also look for certain motor design parameters and performance parameters.

One such motor performance parameter that is helpful in optimizing the control and operations of electric motors is rotor or motor speed. There are many different techniques for estimating motor speed, including complex techniques that are highly accurate but unreliable (i.e., not useful under all conditions) and simplistic techniques that are more reliable but less accurate. Two such motor speed estimation methods, respectively, are (1) motor equivalent models or complex digital signal processing techniques, such as Fast Fourier Transform (FFT) or other frequency-domain signal processing operations, or (2) a technique that implements a linear speed-load curve derived from rated motor speed (RPM) and synchronous speed (RPM). However, each of these techniques has limitations regarding the availability of implementation and/or limitations regarding the accuracy of the motor speed estimation.

With respect to implementing of FFT based speed estimation techniques, it is recognized that for low-end motor control or monitoring products, these techniques often may not be implemented because of hardware and software restrictions. Additionally, it is recognized that such techniques may not be reliable. That is, the accuracy is relatively high when a signal contains enough speed related information; however, when such information is not sufficient, the method can give inaccurate results.

With respect to linear speed estimation techniques, it is recognized that implementation may be limited to motors operating under rated conditions (rated voltage and rated frequency). However, for motors that are operating under rated conditions, such as inverter-fed motors, such motor speed estimation often cannot be used since the rated RPM in the nameplate is only valid for rated motor operations (e.g., at a rated voltage and a rated frequency). Additionally, even for linear speed estimation techniques that can be implemented with inverter-fed motors, it is recognized that errors in the linear motor speed may be present due to error in the rated speed from the name plate information of the motor and non-linear load-speed characteristics of the motor. While such errors may be small (less than 4%), it is still desirable to compensate for such errors in order to derive a more accurate motor speed estimation.

It would therefore be desirable to design a system and method for determining speed of an AC induction machine that is not dependent on set load, voltage, and frequency conditions, so as to enable the improved management and status monitoring. It would further be desirable for such a system and method to provide accurate estimation of the speed in a reliable fashion, regardless of the exact operating conditions of the AC induction machine.

BRIEF DESCRIPTION OF THE INVENTION

Embodiments of the present invention provide a system and method for determining rotor speed of an AC induction machine.

In accordance with one aspect of the invention, a rotor speed estimation system is programmed to estimate a rotor speed of an AC induction machine according to a linear speed estimation algorithm and based on name plate information (NPI) of the AC induction machine and parameters of the AC induction machine during operation thereof, with the parameters comprising voltage and frequency values of power input to the AC induction machine and a load value of the AC induction machine. The rotor speed estimation system is also programmed to estimate a rotor speed of the AC induction machine according to a frequency-domain signal processing algorithm and determine if the rotor speed estimated by the frequency-domain signal processing algorithm is valid. If the rotor speed estimated by the frequency-domain signal processing algorithm is valid then the rotor speed estimation system estimates a tuned rotor speed of the AC induction machine according to the linear speed estimation algorithm and based, in part, on the rotor speed estimated by the frequency-domain signal processing algorithm and stores the tuned rotor speed on a computer readable storage medium.

In accordance with another aspect of the invention, a method of determining rotor speed of an AC induction machine includes accessing name plate information (NPI) of an AC induction machine, with the NPI including a rated power, a rated speed, a rated frequency, and a rated voltage of the AC induction machine. The method also includes determining each of a voltage value and a frequency value of power input to the AC induction machine during operation thereof, determining a load percentage from the AC induction machine during operation thereof, and estimating a rotor speed of the AC induction machine in operation based on the NPI, the voltage and frequency values of the AC induction machine, and the load percentage of the AC induction machine. The method further includes calculating a revised rated speed of the AC induction machine, estimating a tuned rotor speed of the AC induction machine based on the NPI, the voltage and frequency values of the AC induction machine, and the load percentage of the AC induction machine, with the revised rated speed replacing the rated speed from the NPI for estimation of the tuned rotor speed, and storing the tuned rotor speed on a computer readable storage medium.

In accordance with yet another aspect of the invention, a non-transitory computer readable storage medium has stored thereon a computer program comprising instructions which, when executed by at least one processor, cause the at least one processor to acquire a first estimate of a motor speed of an AC motor according to a linear speed estimation algorithm and based on name plate information (NPI) of the AC motor and parameters of the AC motor during operation thereof. The instructions also cause the at least one processor to acquire a second estimate of the motor speed of the AC motor according to a frequency-domain based speed estimation algorithm, perform a validation process on the second estimate of the motor speed of the AC motor, and calculate a rated speed value for the AC motor based on the validated second estimate of the motor speed of the AC motor. The instructions further cause the at least one processor to input the calculated rated speed value into the linear speed estimation algorithm to acquire a tuned estimate of the motor speed of the AC motor and store the tuned motor speed on the computer readable storage medium.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Several embodiments of the invention are set forth that relate to a system and method of estimating speed of an AC induction machine, which may be fed by a fixed frequency supply or a variable frequency supply. Embodiments of the invention thus encompass various types of AC induction machines, including both motors and generators, both single phase and multi-phase, and all voltage levels (low-voltage, medium voltage, and high voltage). The system selectively implements a linear speed estimation algorithm and a frequency domain based speed detection algorithm to determine speed of the AC induction machine.

Figure 1:
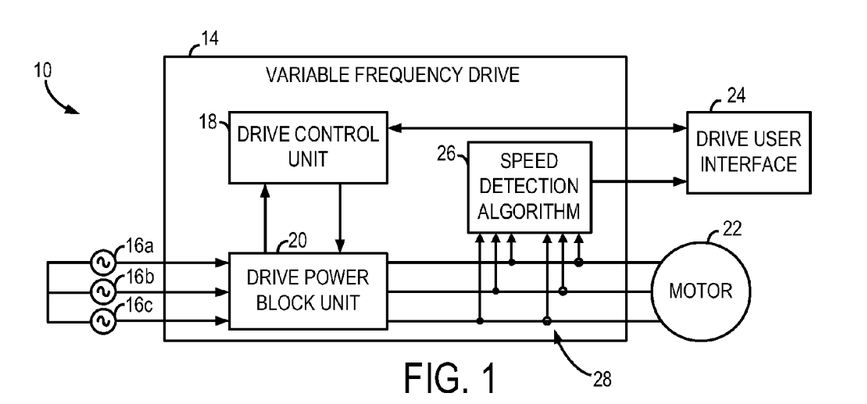
FIG. 1 is schematic of a control system including a motor drive system according to one aspect of the invention.

Various speed estimation systems are shown and described in FIGS. 1-5 with respect to AC motors, according to embodiments of the invention. Referring now to FIG. 1, a general structure of a motor assembly 10 is shown. Motor assembly 10 includes a motor drive 14, which may be configured, for example, as an adjustable or variable speed drive designed to receive a three-phase AC power input power input 16a-16c. Alternatively, motor assembly 10 may be configured to drive a multi-phase motor. According to one embodiment of motor assembly 10, a drive control unit 18 is integrated within motor drive 14 and functions as part of the internal logic of the drive 14, although it is recognized that embodiments of motor assembly 10 may not include such a drive control unit.

Motor drive 14 also includes a drive power block unit 20, which may, for example, contain an uncontrollable or controllable rectification unit (uncontrolled AC to DC), a filtering inductor, a DC bus capacitor or battery, and a pulse width modulation (PWM) inverter (DC to controlled AC). Alternatively, drive power block unit 20 may be provided without such a rectification unit such that the DC bus is directly connected to the inverter. A drive power block unit may be provided without a rectification unit when applied to an uninterruptible power supply (UPS), for example.

Drive 14 receives the three-phase AC input 16a-16c, which is fed to drive power block unit 20. The drive power block unit 20 converts the AC power input to a DC power, inverts and conditions the DC power to a controlled AC power for transmission to an AC motor 22.

Motor assembly 10 also includes a drive user interface 24 or drive control panel, configured to enable users to input motor parameters and drive operating parameters and other parameters necessary for the drive operation. User interface 24 is also used to display a list of motor operating parameters, such as, for example, motor input voltage (rms), motor current (rms), motor input power, speed, torque, etc., to the user for monitoring purposes.

Motor assembly 10 includes a speed detection algorithm module 26 that receives voltage and current signals 28 input to motor 22. According to one embodiment, speed detection algorithm module 26 is integrated within drive 14 and functions as part of the internal logic of drive 14. Alternatively, speed detection algorithm module 26 may be embodied in an external module distinct from drive 14, and receive data therefrom (e.g., current and/or voltage signals), as described in more detail with respect to FIGS. 2 and 3.

Figure 2:
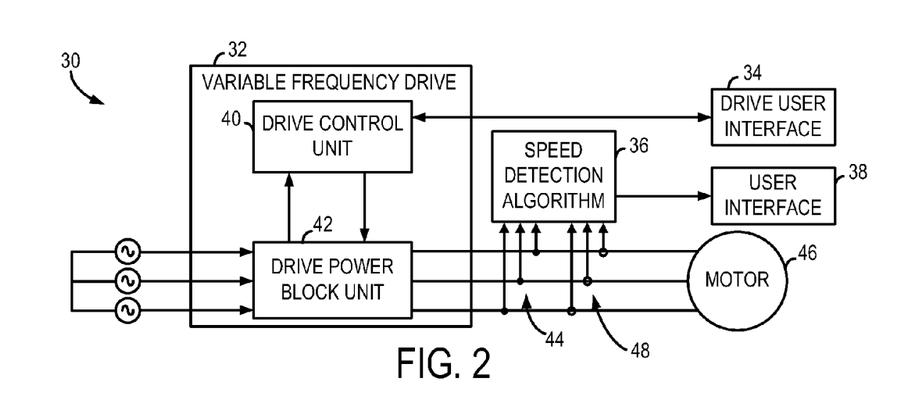
FIG. 2 is a schematic of a control system including a motor drive system according to another aspect of the invention.

Referring now to FIG. 2, a motor assembly 30 is shown according to an embodiment of the invention. Motor assembly 30 includes a variable frequency motor drive 32 and a drive user interface 34. Also included in motor assembly 30, external to drive 32, is a standalone external hardware unit identified as a speed detection algorithm module 36. Speed detection algorithm module 36 receives voltage and current signals, including single-phase current and voltage signals, multiple-phase current and voltage signals, or combinations thereof, which may be used to determine operating conditions. A user interface 38 is coupled to standalone external speed detection algorithm module 36. A drive control unit 40 and drive power block unit 42 are included within motor drive 32.

Speed detection algorithm module 36 is a separate hardware module external to the existing hardware of motor drive 32 and may be installed in an existing motor drive and exchange data through existing drive communications, such as, for example, ModBus, Device Net, Ethernet, and the like. Module 36 uses a set of voltage sensors 44 to measure the multi-phase line-to-line voltages of a motor 46. Module 36 also includes a set of current sensors 48 to measure the multi-phase currents of motor 46. For a three phase current, for example, where no neutral point is available, module 36 includes at least two current sensors for a three-wire system. As the three phase currents add to zero, the third current may be calculated from the other two current values. However, while a third sensor is optional, such sensor increases the accuracy of the overall current calculation.

Figure 3:
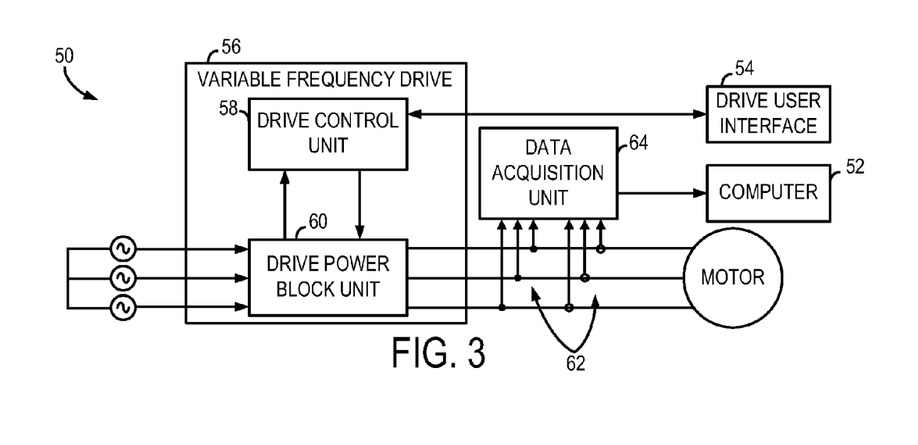
FIG. 3 is a schematic of a control system including a motor drive system according to yet another aspect of the invention.

FIG. 3 illustrates a motor assembly 50 including an external speed detection algorithm module 52 in accordance with another embodiment of the present invention. Similar to the motor assembly described with respect to FIG. 2, motor assembly 50 includes a drive user interface 54 and a variable frequency drive 56 having a drive control unit 58 and a drive power block unit 60. However, unlike the motor assembly of FIG. 2, external module 52 does not have its own voltage and current sensors. Instead, external module 52 is implemented in a computing device that obtains voltage and current signals 62 via a data acquisition unit 64.

Figure 4:
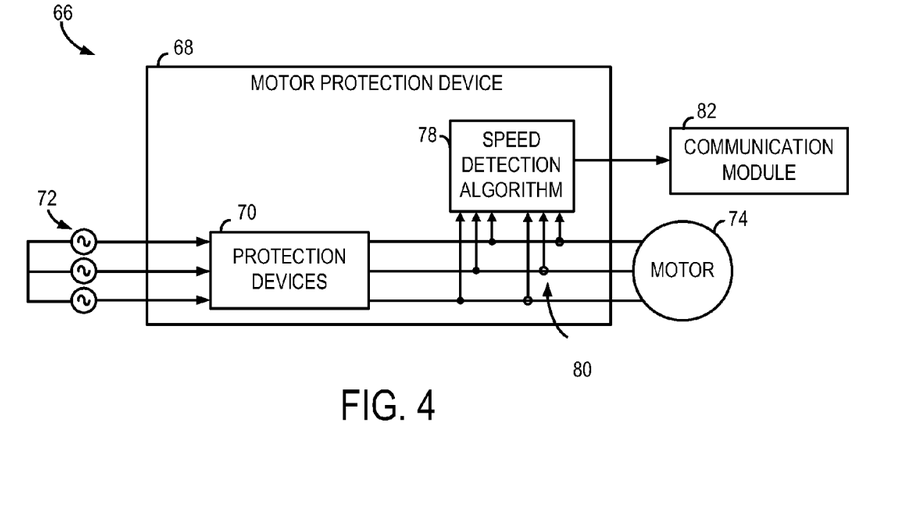
FIG. 4 is a schematic of a control system including a motor protection system according to one aspect of the invention.

Referring now to FIG. 4, a motor protection system 66 is illustrated in accordance with yet another embodiment. System 66 includes a motor protection assembly 68 having at least one motor protection device 70 such as, for example, a contactor assembly having a number of independently controllable contactors configured to selectively control the supply of power from an AC power source 72 to a motor 74. Motor protection assembly 68 also includes a speed detection algorithm module 78 that receives voltage and current data from sensors 80. Speed detection algorithm module 78 analyzes the voltage and current data, along with additional data, to determine the speed of the motor 74 and transmits a signal indicative of the speed to a communication module 82. While speed detection algorithm module 78 is shown as being incorporated into assembly 68, it is recognized that speed detection algorithm module 78 could also be implemented as an external module with its own sensors (e.g., module 36 in FIG. 2) or as an external module without sensors (e.g., module 52 in FIG. 3).

Figure 5:
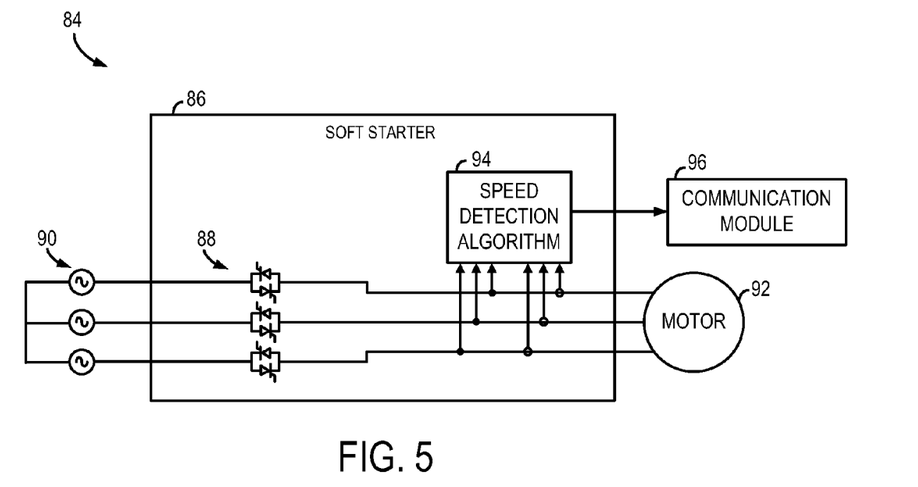
FIG. 5 is a schematic of a control system including a motor starter system according to one aspect of the invention.

According to another embodiment of the present invention, a motor starter system 84 is illustrated in FIG. 5. Motor starter system 84 includes a soft starter 86 having a number of semi-conductor devices 88, such as thyristors and/or diodes, to transmit a supply power between a power source 90 and a motor 92. A speed detection module 94, similar to speed detection algorithm module 26 of FIG. 1, is included within soft starter 86 and is configured to interface with communication module 96. While speed detection algorithm module 94 is shown as being incorporated into soft starter 86, it is recognized that speed detection algorithm module 94 could also be implemented as an external module with its own sensors (e.g., module 36 in FIG. 2) or as an external module without sensors (e.g., module 52 in FIG. 3).

Figure 6:
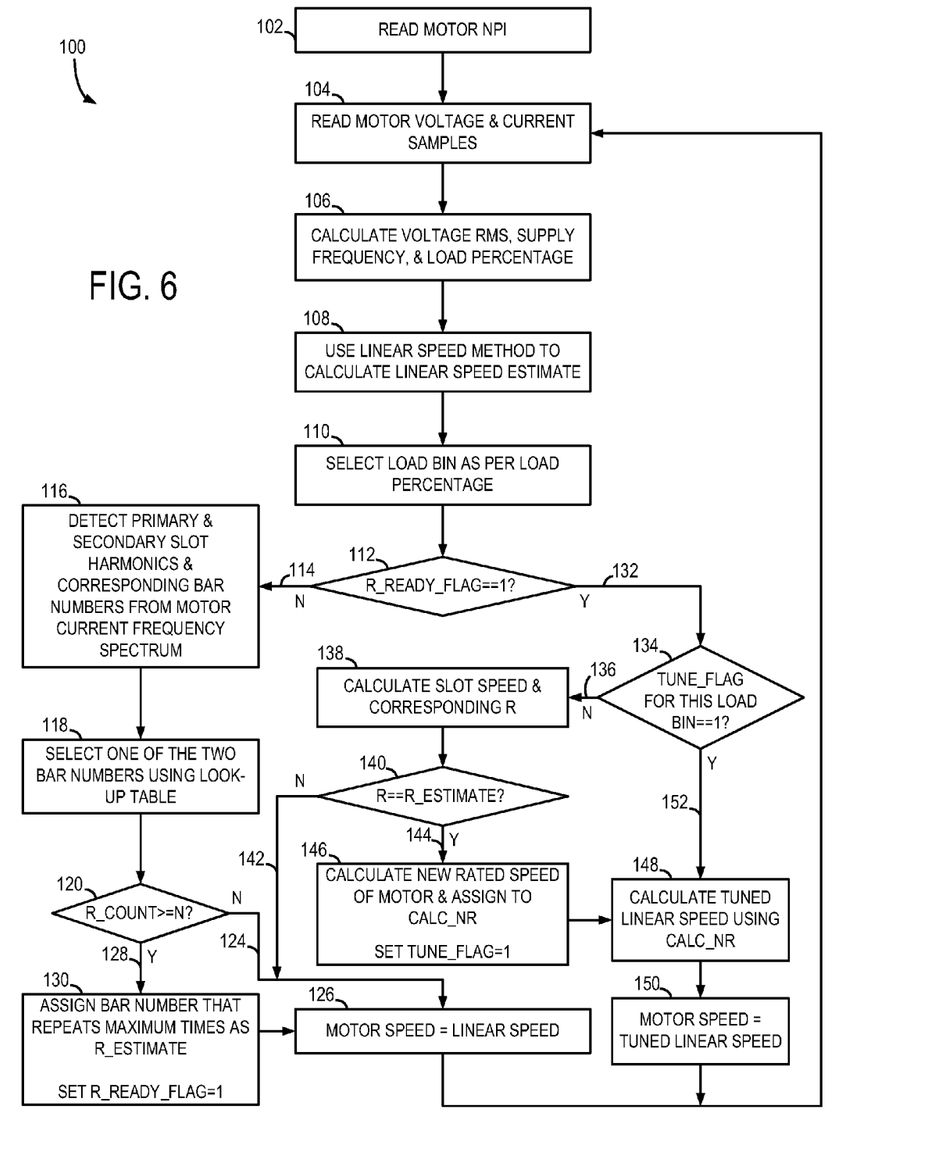
FIG. 6 is a technique for determining rotor speed of an electric motor according to an embodiment of the invention.

Referring now to FIG. 6, a technique 100 for determining rotor speed of an AC induction machine in operation is shown that can be implemented, for example, in any of the systems shown in FIGS. 1-5. While technique 100 is discussed below with respect to determining rotor speed in an AC motor, it is recognized that technique 100 may also be used to determine rotor speed from a variety of AC induction machines (e.g., generators), both single phase and multi-phase, and at any voltage level. Thus, with respect to the embodiment shown and described in FIG. 6, technique 100 may be used to determine the motor speed of single-phase motors, multi-phase motors, inverter driven motors such as variable frequency driven motors, AC motors coupled to a soft-starter, and other types of AC motors or AC motor configurations. Further, embodiments of the invention are not limited to motors operating only at a rated frequency or voltage of the motors. Rather, embodiments of the invention, such as technique 100, are effective at estimating motor speed of AC motors that operate with varying input voltage(s) and/or varying input frequency(ies).

Technique 100 provides a method of speed detection that is capable of using both a linear speed estimation algorithm and a frequency-domain analysis based speed detection algorithm to determine motor speed of the AC motor. According to an exemplary embodiment of the invention, an FFT speed detection algorithm can be implemented as the frequency-domain based processing method, with the speed estimated by the FFT speed detection algorithm being used to "tune" the speed estimated by the linear speed estimation algorithm. Technique 100 begins at block 102, where motor nameplate data or motor nameplate information (NPI) is accessed. According to embodiments of the invention, the NPI includes the rated operating frequency of the motor, the rated operating voltage of the motor, the rated operating speed of the motor, and the rated operating output power of the motor. These NPI parameters are available for electric motors on their nameplate tag. Such NPI may be accessed from a variety of sources. For example, NPI may be manually input by a user through a user interface. In addition, NPI may be accessed from a memory unit located either internal or external to a motor drive, which controls the motor. It is also envisioned that NPI could be gathered or accessed from a network such as, for example, the Internet.

After motor NPI is accessed/read, motor input voltage and current are read at block 104, such as by way of a plurality of voltage and current sensors. Upon reading of the motor input voltage and current, the technique continues at block 106, where a root mean square (rms) voltage, supply frequency, and load value (such as a load percentage or power output of the motor during operation) are determined. For determining the voltage rms, the measured voltage over time can be analyzed to determine the voltage rms in a known manner. For determination of motor voltage rms in a three-phase motor, motor input voltages of multiple phases may be determined and then averaged to produce a single input voltage value, e.g., the voltage rms.

In determining motor input frequency (i.e., supply frequency) of the AC motor at block 106, the sensed/measured motor current and voltage waveforms and a detected the zero crossing point of the current and voltage may be analyzed. As would be understood by those skilled in the art, it is contemplated that the input frequency may be determined from either the voltage or current input or induced into the motor.

Regarding calculation of the load value at block 106, the load value may, for example, be sensed using a sensing device such as a power meter. Alternatively, a load value such as motor power output may be approximated to be equal to the input power of the motor or determined in another manner. Further details regarding the determination of the load value will be set forth in greater detail below.

It is noted that, according to embodiments of the invention, the order in which motor input voltage, motor input frequency, motor power output, and motor NPI are determined or accessed as shown in blocks 102-106 need not be the same as that shown in FIG. 6. Rather, NPI may be accessed and motor input voltage, motor input frequency, and the load value may be determined simultaneously or in another order different than the order shown in FIG. 6.

Referring back to the embodiment of technique 100 shown in FIG. 6, after determining the voltage rms, supply frequency, and load percentage at block 106, the technique proceeds to block 108, where the speed of the motor is determined by implementing a linear speed estimation algorithm that determines motor speed based on the determined motor input voltage, the determined motor input frequency, the determined load value, and the accessed NPI.

According to one embodiment of the invention, the motor speed is estimated by the linear speed algorithm according to the following relationship:

$$\omega_{r\_x} = \frac{\omega_{r\_rated\_2} - \omega_{syn\_2}}{P_{m\_rated\_2}} \cdot P_{m\_x} + \omega_{syn\_2}, \quad \text{(Eqn. 1),}$$

where $\omega_{r\_x}$ refers to the motor speed (i.e., mechanical angular speed of the rotor). As will be shown in detail below, the variables of Eqn. 1 may be determined from a motor input voltage, a motor input frequency, a motor load value, $P_{m\_x}$, such as load percentage and NPI of the motor.

To estimate the speed of a motor according to the embodiment encompassed by Eqn. 1, begin by setting the accessed NPI of the motor to the following:

Rated Voltage, $\upsilon_{s\_1}$;
Rated Frequency, $f_{s\_1}$;
Rated Output Power, $P_{m\_rated\_1}$; and
Rated Speed in radians per second, $\omega_{r\_Rated\_1}$.

These NPI parameters represent rated values at a rated motor operating condition (i.e., a motor operating at rated voltage and rated frequency).

From the NPI, a rated torque of the motor may be defined as follows:

$$T_{rated\_1} = \frac{P_{m\_rated\_1}}{\omega_{r\_rated\_1}}, \qquad \text{(Eqn. 2).}$$

In addition, a rated synchronous speed, a $\omega_{syn\_1}$, of the motor may be determined in the following manner:

$$\omega_{syn\_1} = \frac{120 \cdot f_{s\_1}}{p} \cdot \frac{2\pi}{60}, \qquad \text{(Eqn. 3),}$$

where p refers to the number of poles of the motor.

Next, a rated slip, $s_{rated\_1}$, of the motor may be determined in the following manner:

$$S_{rated\_1} = \frac{\omega_{syn\_1} - \omega_{r\_Rated\_1}}{\omega_{syn\_1}}, \qquad \text{(Eqn. 4).}$$

Using Eqns. 1-4 above, a speed curve representative of an AC motor operating at rated operating parameters (e.g., rated voltage, $\upsilon_{s\_1}$, and rated frequency, $f_{s\_1}$) may be determined.

Still referring to the present embodiment, a motor speed of an AC motor operating at any arbitrary input voltage, $\upsilon_{s\_2}$, arbitrary input frequency, $f_{s\_2}$, and arbitrary load value, $P_{m\_x}$, can now be determined using the following set of equations:

$$S_{rated\_2} = s_{rated\_1} \cdot \left(\frac{f_{s\_1}}{f_{s\_2}}\right), \qquad \text{(Eqn. 5);}$$

$$\omega_{syn\_2} = \omega_{syn\_1} \cdot \left(\frac{f_{s\_2}}{f_{s\_1}}\right), \qquad \text{(Eqn. 6);}$$

$$\omega_{r\_rated\_2} = \omega_{syn\_2} \cdot (1 - s_{rated\_2}), \qquad \text{(Eqn. 7);}$$

$$T_{rated\_2} = T_{rated\_1} \cdot \left(\frac{\upsilon_{s\_2}}{\upsilon_{s\_1}}\right)^2 \cdot \left(\frac{f_{s\_1}}{f_{s\_2}}\right)^2, \qquad \text{(Eqn. 8);}$$

and $$P_{m\_rated\_2} = T_{rated\_2} \cdot \omega_{r\_rated\_2}, \qquad \text{(Eqn. 9).}$$

By implementing Eqns. 2-9, the speed, $\omega_{r\_x}$, of an AC motor operating at any given load (e.g., when the motor delivers any given mechanical output power $P_{m\_x}$), any given input voltage, $\upsilon_{s\_2}$, and any given input frequency, $f_{s\_2}$, may be estimated in the manner set forth by Eqn. 1, shown again below:

$$\omega_{r\_x} = \frac{\omega_{r\_rated\_2} - \omega_{syn\_2}}{P_{m\_rated\_2}} \cdot P_{m\_x} + \omega_{syn\_2}, \qquad \text{(Eqn. 1).}$$

In other words, as shown with Eqns. 1-9 above and the accompanying description, the motor speed, $\omega_{r\_x}$, may be estimated merely with the determined motor input voltage, $\upsilon_{s\_2}$, the determined motor input frequency, $f_{s\_2}$, the determined load value, $P_{m\_x}$, such as motor power output, and the accessed NPI (i.e., rated motor power, $P_{m\_rated\_1}$, rated motor speed, $\omega_{r\_Rated\_1}$, rated voltage, $\upsilon_{s\_1}$, and rated frequency, $f_{s\_1}$, of the motor). Thus, the linear speed algorithm produces effective speed estimations at any arbitrary input voltage, $\upsilon_{s\_2}$, and any arbitrary input frequency, $f_{s\_2}$—not just at a rated voltage and rated frequency of the AC motor.

According to an embodiment of the invention, upon determination of the motor speed at block 108 via the linear speed algorithm using the parameters set forth above, technique continues at block 110 by characterizing operation of the motor as falling within a pre-determined "bin" based on the load percentage (determined at block 106). The load percentage is characterized to fall within, or outside of, one of several bins so as to allow for compensation of the non-linear characteristics of a load-speed curve of the motor in a more accurate fashion. That is, as will be explained in detail below, a distinct tuning of the motor speed estimated by the linear speed detection algorithm is desired for each bin, so as to allow for compensation of the non-linear characteristics of a load-speed curve of the motor. The load bins can be defined, for example, as in the below table:

| Load Bins | Load Range (as % of rated load) |
|---|---|
| Bin 1 | 40% <= load % <= 50% |
| Bin 2 | 50% < load % <= 70% |
| Bin 3 | 70% < load % <= 90% |

Tuning of the motor speed estimated by the linear speed detection algorithm is determined to be desirable when the load percentage is determined to be between 40% and 90% of the rated load. According to embodiment of the invention, it may desirable to provide no additional tuning to the motor speed estimated by the linear speed detection algorithm if the load percentage falls outside of the pre-determined bins (e.g., <40% or >90% of the rated load.

Upon classification of the load percentage within or outside of certain pre-determined bins at block 110, a determination is made at block 112 as to whether further "tuning" of the estimated motor speed can be performed at that time. More specifically, a determination is made regarding whether an estimate of a "reference" rotor bar number ($R_{estimate}$) for the motor has been acquired from a previous iteration of the technique 100. A flag for acquisition of the rotor bar number (R_ready_flag) can be set initially at zero (0) and be changed to one (1) upon acquisition of the rotor bar number, with it being determined at block 112 if the flag, R_ready_flag, is currently at zero or one. In a first iteration of technique 100, an estimate of the rotor bar number for the motor will not be available, and thus the flag will be at zero. When it is determined that an estimate of the rotor bar number, $R_{estimate}$, for the motor has not yet been acquired, indicated at 114, the technique 100 will continue at block 116, where a rotor bar number estimation routine (blocks 116-130) is initiated.

The rotor bar number estimation routine of blocks 116-130 implements a frequency-domain analysis speed detection algorithm (e.g., an FFT speed detection algorithm) for determining rotor speed of the motor and the rotor bar number of the motor. For purposes of the rotor bar number estimation routine 116-130, the FFT speed detection algorithm is applied for the purpose of estimating a "reference" rotor bar number, $R_{estimate}$, which will then be subsequently used for verification of the accuracy of future rotor speed estimations using the FFT speed detection algorithm, as will be explained in detail below.

The rotor bar number estimation routine begins at block 116 with detection of slot harmonics from the motor current frequency spectrum, as it is recognized that slot harmonics detected from the motor current frequency spectrum are associated with the rotor bar number of the motor. Thus, accurate slot harmonics detection is desired for providing an accurate estimate of the rotor bar number. For determining the slot harmonics, the FFT speed detection algorithm is implemented at block 116. The FFT speed detection algorithm makes use of sampled stator current data (acquired at block 104) for determination of a saliency slot harmonic frequency. The slot harmonics provide desirable bandwidth speed information and serve as the primary basis for the FFT speed detection algorithm. According to an embodiment of the invention, the saliency harmonic equation is provided as:

$$f_{seh} = f_1\left[(kR + n_d)\frac{(1-s)}{P} + n_w\right],\quad \text{(Eqn. 10)}$$

where $f_1$ is the fundamental stator frequency, k is a constant, R is the rotor bar number, P is the number of pole-pairs in the motor, $n_d$ is an order of eccentricity, $n_w$ is the time harmonic order arising from odd phase belt harmonics of $f_1$, and s is motor slip.

Before the FFT speed detection algorithm can operate to identify slot harmonics, all of the machine structural parameters in Eqn. 10 need to be determined. For Eqn. 10, it is assumed that k=1 for determination of slot harmonics and that P can be easily determined from the nameplate for user input. In general, the parameters s, R, $n_d$ and $n_w$ in Eqn. 1 are unknown.

For determining the slip s, linear slip is fed as the initial slip estimate, such that the detection of slot harmonics even at low supply frequency (e.g., <30 Hz) is improved. Linear slip is defined by the below equation:

$$\text{Linear slip} = \frac{\text{synchronous speed} - \text{linear speed}}{\text{synchronous speed}},\quad \text{(Eqn. 11)}$$

where the synchronous speed is a known quantity (e.g., based on the number of poles in the motor, etc.) and the linear speed is known from block 108.

Having determined the slip, values are assumed for $n_d$ and $n_w$ in order that the value for R can then be determined. That is, it is assumed that $n_d$ corresponding to a detected slot harmonic is set to zero and that $n_w$ is set to each of a plurality of odd integer settings. In setting $n_w$ to each of a plurality of odd integer settings, it is recognized that each of the magnitude of the slot harmonics and the spacing between pairs of slot harmonics is used as a criterion for detecting the primary slot harmonic. The odd integer settings of $n_w$ correspond to spacing between the pair of slot harmonics of approximately twice of the fundamental frequency (i.e., spacing=2*$f_1$). The value for R can then be determined, with possible values of R being determined given knowledge of the motor frame size and the number of poles, and using a simple rules-based selection. An exemplary range of rotor bar numbers for respective numbers of poles in a motor is defined in TABLE I.

TABLE I

| No. of poles | Bar Range |
|---|---|
| 2 | R = [18, 20, 22, 24, 25, 26, 28, 30, 32, 34, 38, 40, 44, 46, 48, 52, 60] |
| 4 | R = [22, 26, 28, 32, 36, 38, 40, 44, 45, 46, 47, 48, 50, 54, 56, 58, 60, 72, 76] |
| 6 | R = [16, 26, 27, 33, 36, 40, 42, 44, 45, 46, 48, 54, 55, 56, 57, 58, 60, 66, 84, 88] |
| >=8 | R = [40, 42, 44, 45, 48, 52, 58, 60, 64, 70, 80, 82, 88, 89, 92] |

For each potential value of R, both $n_w$=1 and $n_w$=−1 are first considered and, as set forth above, an assumption is made that $n_d$=0. Using the slip value determined from Eqn. 11, the magnitude of the interpolated FFT spectrum can be evaluated at the precise slot harmonic frequencies defined by Eqn. 10 for each combination of R and $n_w$. The parameter combination which matches a clear peak is assumed to indicate the primary harmonic, with the primary harmonic having the desired value of R associated therewith.

In addition to detection of the primary slot harmonic, and to improve slot harmonic detection under conditions where stray harmonics dominate the primary slot harmonic in magnitude, the secondary slot harmonic is also detected. That is, the slot harmonic second in magnitude to the primary slot harmonic is detected and identified as the secondary slot harmonic.

Upon detecting both primary and secondary slot harmonics, one of the harmonics is chosen at block 118 as the dominant slot harmonic between the primary and secondary slot harmonics for determination of the estimated rotor bar number for that iteration, $R_{1\ldots N}$. According to one embodiment of the invention, selection of one of the primary and secondary slot harmonics is based on a rotor bar number look-up table. An example of such a rotor bar number look-up table is provided below:

TABLE II

| No. of poles | Stator/Rotor Slot Number | | | | |
|---|---|---|---|---|---|
| 2 | 36/28 | 48/38 | 54/46 | 60/52 | |
| 4 | 48/40 | 48/56 | 60/44 | 60/76 | 72/58 |
| 6 | 54/42 | 54/66 | 72/88 | 72/54 | 72/84 |
| 8 | 54/70 | 72/58 | 72/88 | | |
| 10 | 72/88 | 72/92 | | | |
| 12 | 72/92 | | | | |

The bar number, out of the two that correspond to the primary and secondary slot harmonics, that belongs to the set of numbers in TABLE II for the given pole number, is selected as the rotor bar number of the motor for that iteration, $R_{1\ldots N}$. For example, for the given pole number equal to 8, the rotor bar number corresponding to the primary slot harmonic is 60 and the rotor bar number corresponding to that of secondary slot harmonic is 58. Comparing the two bar numbers 60, 58 to the set {70, 58, 88} in TABLE II, the secondary slot harmonic is selected as the correct slot harmonic as 58 belongs to the set of rotor slot numbers in TABLE II. In a case where both the numbers belong to the set in TABLE II, the bar number corresponding to the primary slot harmonic is selected as the rotor bar number of the motor for that iteration $R_{1\ldots N}$.

Upon selection of the rotor bar number associated with the dominant slot harmonic, $R_{1...N}$, technique continues with a determination at block 120 as to whether an appropriate number of rotor bar number estimates (R_count) have been collected to provide for an accurate overall/final estimation of the rotor bar number. That is, the rotor bar number is determined by using initial N number of rotor bar estimates. N could be chosen as 100 or 200 iterations basing on the algorithm execution time. If it is determined that N number of rotor bar estimates have not been collected (R_count<N), indicated at 124, then the technique continues at block 126 by outputting the previous linearly estimated determined motor speed as the determined motor speed, before looping back to block 104. Blocks 116-130 of the rotor bar number estimation routine are then repeated (upon determining at block 112 that R_ready_flag is still at zero) to acquire another rotor bar estimate. This loop is repeated until N number of rotor bar estimates is collected.

When N number of rotor bar estimates is collected, it is determined at block 122 that N number of rotor bar estimates have been collected (R_count>=N), indicated at 128. The technique thus continues at block 130, where a rotor bar number, $R_{estimate}$, is selected from the N number of rotor bar estimates, $R_{1...N}$. After N number of iterations, the bar number that repeats the maximum number of times is considered as the estimated rotor bar number of the motor, $R_{estimate}$. That is, $R_{estimate}$ is equal to the bar number that repeats a maximum number of times in N iterations. According to one embodiment of the invention, in order to select a rotor bar number, it is desired that the estimated rotor bar number, $R_{estimate}$, should account for at least 40% of the total number of N values. Also at block 130, upon determination of $R_{estimate}$, the flag for acquisition of the rotor bar number (R_ready_flag) is set to one (1).

Upon determination of $R_{estimate}$, the technique then proceeds from block 130 to block 126, where the previous linearly estimated motor speed is output as the determined motor speed, before looping back to block 104. Upon performing of blocks 104-110, the technique returns to block 112, where the determination is made that "tuning" of the estimated motor speed can be performed at that time, indicated at 132, as R_ready_flag is set to one. The technique thus continues to block 134, where a determination is made as to whether further "tuning" of the estimated motor speed can be performed at that time. More specifically, a determination is made regarding whether an estimate of a "new" rated speed for the motor has been acquired (i.e., other than the rated speed from the motor NPI) from a previous iteration of the technique 100. A flag for acquisition of the rated speed (tune_flag) can be set initially at zero (0) and be changed to one (1) upon acquisition of the rated speed, with it being determined at block 134 if the flag is currently at zero or one. In a first iteration of technique 100 after having determined the rotor bar number, $R_{estimate}$, an estimate of the rated speed for the motor will not be available, and thus the flag will be at zero.

According to one embodiment, a tune_flag is provided for each of the plurality of bins that correspond to a load percentage of the motor. That is, as set forth above for block 110, operation of the motor is analyzed to determine the present load percentage at which the motor is currently operating, with the load percentage being characterized to fall within, or outside of, one of several bins. If the present load percentage of the motor falls within one of the above bins, such as within Bin 1, it is determined at block 134 whether an estimate of the rated speed for the motor has been acquired for that bin (i.e., for Bin 1)

If a determination is made that an estimate of the rated speed for the motor is not available and has not been acquired for that bin (e.g., the tune_flag for Bin 1 is zero), identified at 136, technique 100 proceeds to block 138, where the slot speed of the motor is calculated using a FFT speed detection algorithm, such as by implementing Eqn. 10 set forth above. Along with the calculation of the slot speed of the motor, application of the FFT speed detection algorithm of Eqn. 10 at block 138 will also output an estimated rotor bar number, R, for the motor associated with the slot speed.

At block 140, a determination is then made as to whether the rotor bar number estimated at block 138, R, is equal to the rotor bar number estimate, $R_{estimate}$, output at block 130 from the rotor bar number estimation routine (blocks 116-130). The determination at block 140 serves to validate the slot harmonics and the corresponding calculated slot speed in the FFT speed detection algorithm implemented at block 138 for its correctness, so as to determine whether the slot speed of the motor output from the FFT speed detection algorithm is accurate for purposes of tuning the linear speed estimated at block 108.

If it determined at block 140 that the rotor bar number estimated at block 138 is not equal to the rotor bar number estimate, $R_{estimate}$, output at block 130, indicated at 142, then it is determined that the slot speed calculated at block 138 from the FFT speed detection algorithm is not accurate. The technique 100 thus determines that the slot speed will not be implemented to "tune" the motor speed determined at block 108 by the linear speed estimation and thus continues to block 126, where the linearly estimated motor speed is output as the determined motor speed, before technique loops back to block 104.

Alternatively, if it determined at block 140 that the rotor bar number estimated at block 138 is equal to the rotor bar number estimate, $R_{estimate}$, output at block 130, indicated at 144, then it is determined that the slot speed calculated from the FFT speed detection algorithm is accurate. The technique 100 thus determines that the slot speed should be implemented to "tune" the motor speed determined at block 108 by the linear speed estimation and thus continues to block 146, where the slot speed calculated from the FFT speed detection algorithm is utilized to calculate a new rated speed of the motor (Cal-c_NR).

Figure 7:
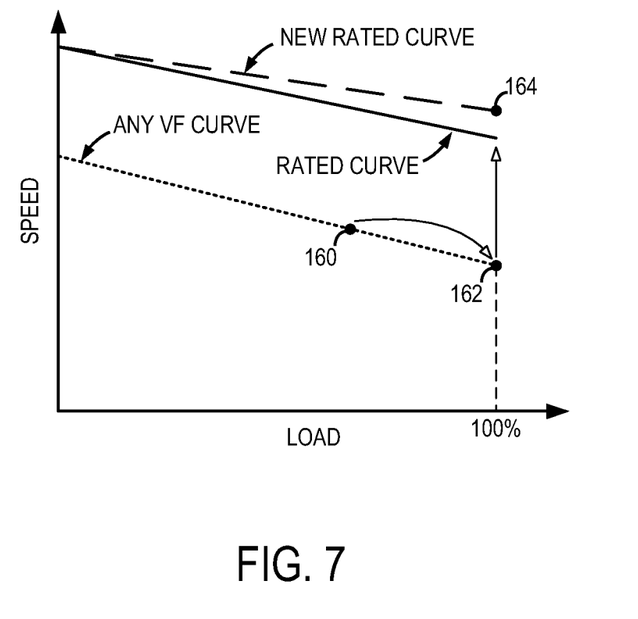
FIG. 7 is a graphical representation of load-speed curves of a motor operating at a selected voltage-frequency and at a rated voltage-frequency.

Calculation of the new rated speed of the motor is illustrated in FIG. 7. The slot speed calculated at block 138 (indicated at 160) is used to calculate speed at 100% load under the same voltage and frequency input as of the slot speed (indicated at 162). The estimated rated speed is given by the equation:

$$\text{Estimated Rated Speed at 100\% load} = \frac{(\text{slot speed} - \text{synchronous speed})}{\text{load percentage}} * 100 + \text{synchronous speed}. \quad \text{(Eqn. 12)}$$

The speed at 100% load at arbitrary voltage and frequency is used to recalculate the rated speed at rated voltage, frequency, and load (indicated at 164). The rated speed 164 is assumed to be a more accurate than the rated speed provided on the motor NPI, and thus provides a more accurate estimation of the motor speed when implemented in the linear speed estimation algorithm of Eqn. 1.

Referring again to FIG. 6, the new rated speed of the motor at rated voltage, frequency, and load, is thus calculated at block 146 via the use of the calculated slot speed and Eqn. 12.

Also at block 146, upon calculation of the new rated speed of the motor, tune_flag is set to one for that bin for which blocks 138-146 of technique 100 were performed. Upon calculation of the new rated speed and setting of tune_flag, technique 100 continues at block 148, where the new rated speed of the motor is used to recalculate the motor speed using the linear speed estimation algorithm, with the recalculated speed being termed the "tuned linear speed." The new rated speed of the motor is input into Eqn. 1, where thereby the linear speed estimation algorithm outputs the tuned linear speed at block 150.

Upon estimation of the tuned linear speed of the motor, technique loops back to block 104, for further monitoring of the motor speed. Upon again reaching block 134, a determination is again made regarding whether an estimate of the new rated speed for the motor has been acquired from a previous iteration of the technique 100 for a particular bin. According to the previous example, the new rated speed was estimated for a load percentage falling within Bin 1. Thus, if the present load percentage measured at block 104 again falls within Bin 1, a determination is made at block 134 that the new rated speed for the motor has been acquired from a previous iteration for that bin, indicated at 152, and the technique continues at block 150, where the new rated speed of the motor is used to recalculate the motor speed using the linear speed estimation algorithm of Eqn. 1. If however, the present load percentage measured at block 104 does not fall within Bin 1 (e.g., falls within Bin 2 or Bin 3), then a determination is made at block 134 that the new rated speed for the motor has not been acquired from a previous iteration for that bin, indicated at 136, and technique 100 would perform blocks 138-146, as described above, for purposes of determining the new rated speed for the motor for the particular bin within which the present load percentage measured at block 104 falls into.

Embodiments of the invention may be applied to motor assemblies that include an AC motor fed by a fixed or variable frequency supply Also, the technique may be embodied in an internal module that receives a single-phase current signal or in a stand-alone external module configured to receive any combination of single-phase, three-phase, or multi-phase voltage and current signals. Further, while several embodiments of the invention are described with respect to an AC motor and AC motor drive, it is contemplated that the technique set forth herein may be applied to a wide variety of applications, including fixed and variable voltage applications. Embodiments of the invention may rely on voltage, frequency, current, and/or power sensors of a motor drive and/or motor to determine input values for estimating motor speed. It is also noted that embodiments of the invention allow for determination of motor speed at any arbitrary input voltage, any arbitrary input frequency, and any arbitrary load.

The above-described methods can be embodied in the form of computer program code containing instructions embodied in one or more tangible computer readable storage media, such as floppy diskettes and other magnetic storage media, CD ROMs and other optical storage media, flash memory and other solid-state storage devices, hard drives, or any other computer-readable storage medium, wherein, when the computer program code is loaded into and executed by a computer, the computer becomes an apparatus for practicing the disclosed method. The above-described methods can also be embodied in the form of a generically termed "speed estimation system" configured to estimate the speed of the rotor of the AC motor that would include a processor in the form of a speed detection algorithm unit and/or computer shown in the various embodiments of FIGS. 1-5.

A technical contribution for the disclosed method and apparatus is that it provides for a controller implemented technique for determining rotor speed for fixed and variable supply frequency applications.

Therefore, according to one embodiment of the present invention, a rotor speed estimation system is programmed to estimate a rotor speed of an AC induction machine according to a linear speed estimation algorithm and based on name plate information (NPI) of the AC induction machine and parameters of the AC induction machine during operation thereof, with the parameters comprising voltage and frequency values of power input to the AC induction machine and a load value of the AC induction machine. The rotor speed estimation system is also programmed to estimate a rotor speed of the AC induction machine according to a frequency-domain signal processing algorithm and determine if the rotor speed estimated by the frequency-domain signal processing algorithm is valid. If the rotor speed estimated by the frequency-domain signal processing algorithm is valid then the rotor speed estimation system estimates a tuned rotor speed of the AC induction machine according to the linear speed estimation algorithm and based, in part, on the rotor speed estimated by the frequency-domain signal processing algorithm and stores the tuned rotor speed on a computer readable storage medium.

According to another embodiment of the present invention, a method of determining rotor speed of an AC induction machine includes accessing name plate information (NPI) of an AC induction machine, with the NPI including a rated power, a rated speed, a rated frequency, and a rated voltage of the AC induction machine. The method also includes determining each of a voltage value and a frequency value of power input to the AC induction machine during operation thereof, determining a load percentage from the AC induction machine during operation thereof, and estimating a rotor speed of the AC induction machine in operation based on the NPI, the voltage and frequency values of the AC induction machine, and the load percentage of the AC induction machine. The method further includes calculating a revised rated speed of the AC induction machine, estimating a tuned rotor speed of the AC induction machine based on the NPI, the voltage and frequency values of the AC induction machine, and the load percentage of the AC induction machine, with the revised rated speed replacing the rated speed from the NPI for estimation of the tuned rotor speed, and storing the tuned rotor speed on a computer readable storage medium.

According to yet another embodiment of the present invention, a non-transitory computer readable storage medium has stored thereon a computer program comprising instructions which, when executed by at least one processor, cause the at least one processor to acquire a first estimate of a motor speed of an AC motor according to a linear speed estimation algorithm and based on name plate information (NPI) of the AC motor and parameters of the AC motor during operation thereof. The instructions also cause the at least one processor to acquire a second estimate of the motor speed of the AC motor according to a frequency-domain based speed estimation algorithm, perform a validation process on the second estimate of the motor speed of the AC motor, and calculate a rated speed value for the AC motor based on the validated second estimate of the motor speed of the AC motor. The instructions further cause the at least one processor to input the calculated rated speed value into the linear speed estimation algorithm to acquire a tuned estimate of the motor speed of the AC motor and store the tuned motor speed on the computer readable storage medium.

The present invention has been described in terms of the preferred embodiment, and it is recognized that equivalents, alternatives, and modifications, aside from those expressly stated, are possible and within the scope of the appending claims.

What is claimed is:

1. A rotor speed estimation system for estimating a rotor speed of an AC induction machine, the rotor speed estimation system comprising:
 a processor programmed to:
  receive an input from a data acquisition device or a plurality of sensors, the input comprising parameters of the AC induction machine during operation thereof, with the parameters comprising voltage and frequency values of power input to the AC induction machine and a load value of the AC induction machine
  estimate a rotor speed of the AC induction machine according to a linear speed estimation algorithm and based on name plate information (NPI) of the AC induction machine and the parameters of the AC induction machine during operation thereof;
  estimate a rotor speed of the AC induction machine according to a frequency-domain signal processing algorithm;
  determine if the rotor speed estimated by the frequency-domain signal processing algorithm is valid; and
  if the rotor speed estimated by the frequency-domain signal processing algorithm is valid, then:
   estimate a tuned rotor speed of the AC induction machine according to the linear speed estimation algorithm and based, in part, on the rotor speed estimated by the frequency-domain signal processing algorithm;
   store the tuned rotor speed on a computer readable storage medium; and control operation of the AC induction machine based on the tuned rotor speed.

2. The rotor speed estimation system of claim 1 wherein the AC induction machine NPI comprises a rated power, a rated speed, a rated frequency, and a rated voltage of the AC induction machine.

3. The rotor speed estimation system of claim 2 wherein the processor is further programmed to:
 calculate a revised rated speed of the AC induction machine based on the rotor speed estimated by the frequency-domain signal processing algorithm; and
 estimate the tuned rotor speed of the AC induction machine according to the linear speed estimation algorithm, wherein the revised rated speed of the rotor is input into the linear speed estimation algorithm in place of the rated speed from the AC induction machine NPI.

4. The rotor speed estimation system of claim 3 wherein the processor is further programmed to:
 characterize operation of the AC induction machine as falling within one of a plurality of bins based on the load value; and
 calculate a revised rated speed of the AC induction machine for each of the plurality of bins.

5. The rotor speed estimation system of claim 2 wherein the processor is further programmed to:
 detect primary and secondary slot harmonics of the AC induction machine; and
 estimate a rotor bar number of the AC induction machine based on one of the primary and secondary slot harmonics.

6. The rotor speed estimation system of claim 5 wherein the processor is further programmed to:
 acquire a pre-determined number of rotor bar number estimates;
 identify a rotor bar number that repeats the greatest number of times in the pre-determined number of rotor bar number estimates; and
 set the rotor bar number that repeats the greatest number of times as the determined rotor bar number, $R_{estimate}$.

7. The rotor speed estimation system of claim 6 wherein the processor is further programmed to:
 associate a rotor bar number of the AC induction machine with the rotor speed estimated by the frequency-domain signal processing algorithm;
 compare the rotor bar number from the frequency-domain signal processing algorithm with the determined rotor bar number, $R_{estimate}$; and
 if the rotor bar number from the frequency-domain signal processing algorithm is equal to the determined rotor bar number, $R_{estimate}$, then determine that the rotor speed estimated by the frequency-domain signal processing algorithm is valid.

8. The rotor speed estimation system of claim 1 wherein the processor is further programmed to:
 forego tuning of the rotor speed estimated by the linear speed estimation algorithm if the rotor speed estimated by the frequency-domain signal processing algorithm is found to be invalid; and
 store the rotor speed estimated by the linear speed estimation algorithm as an unturned rotor speed on the computer readable storage medium.

9. The rotor speed estimation system of claim 1 wherein the AC induction machine comprises an AC motor, and wherein the rotor speed estimation system comprises one of a variable frequency drive, a motor protection device, a soft starter, and a removable device coupled to a motor drive of the AC motor.

10. A method of determining rotor speed of an AC induction machine, the method comprising:
 causing a processor to:
  access name plate information (NPI) of an AC induction machine, wherein the NPI comprises a rated power, a rated speed, a rated frequency, and a rated voltage of the AC induction machine;
  determine each of a voltage value and a frequency value of power input to the AC induction machine during operation thereof;
  determine a load percentage from the AC induction machine during operation thereof;
  estimate a rotor speed of the AC induction machine in operation based on the NPI, the voltage and frequency values of the AC induction machine, and the load percentage of the AC induction machine;
  calculate a revised rated speed of the AC induction machine;
  estimate a tuned rotor speed of the AC induction machine based on the NPI, the voltage and frequency values of the AC induction machine, and the load percentage of the AC induction machine, with the revised rated speed replacing the rated speed from the NPI for estimation of the tuned rotor speed;
  store the tuned rotor speed on a computer readable storage medium; and control operation of the AC induction machine based on the tuned rotor speed.

11. The method of claim 10 further comprising causing the processor to:
 detect slot harmonics of the AC induction machine; and
 estimate a reference rotor bar number of the AC induction machine from the slot harmonics.

12. The method of claim 11 wherein estimating the reference rotor bar number of the AC induction machine comprises:
  accessing a look-up table associating a number of poles of the AC induction machine, rotor bar numbers of the AC induction machine, and primary and secondary slot harmonics of the AC induction machine; and
  selecting the reference rotor bar number of the AC induction machine based on the look-up table.

13. The method of claim 11 further comprising causing the processor to:
  acquire a pre-determined number of reference rotor bar number estimates;
  identify a reference rotor bar number that repeats the greatest number of times in the pre-determined number of rotor bar number estimates; and
  set the reference rotor bar number that repeats the greatest number of times as the reference rotor bar number, $R_{estimate}$.

14. The method of claim 13 further comprising causing the processor to:
  estimate a rotor slot speed and an associated rotor bar number from the slot harmonics according to a frequency-domain signal processing algorithm;
  compare the rotor bar number associated with the rotor slot speed to the reference rotor bar number, $R_{estimate}$;
  validate that the rotor bar number associated with the rotor slot speed is equal to the determined rotor bar number, $R_{estimate}$; and
  determine the revised rated speed of the AC induction machine from the validated slot speed.

15. The method of claim 10 further comprising causing the processor to associate the revised rated speed of the AC induction machine with one of a plurality of bins, each of the plurality of bins defining a load percentage operating range of the AC induction machine.

16. A non-transitory computer readable storage medium having stored thereon a computer program comprising instructions which, when executed by at least one processor, cause the at least one processor to:
  acquire a first estimate of a motor speed of an AC motor according to a linear speed estimation algorithm and based on name plate information (NPI) of the AC motor and parameters of the AC motor during operation thereof;
  acquire a second estimate of the motor speed of the AC motor according to a frequency-domain based speed estimation algorithm;
  perform a validation process on the second estimate of the motor speed of the AC motor;
  calculate a rated speed value for the AC motor based on the validated second estimate of the motor speed of the AC motor;
  input the calculated rated speed value into the linear speed estimation algorithm to acquire a tuned estimate of the motor speed of the AC motor;
  store the tuned motor speed on the computer readable storage medium; and control operation of the AC motor based on the tuned rotor speed.

17. The non-transitory computer readable storage medium of claim 16 wherein the instructions further cause the at least one processor to:
  detect primary and secondary slot harmonics of the AC motor; and
  estimate a reference rotor bar number of the AC motor based on one of the primary and secondary slot harmonics.

18. The non-transitory computer readable storage medium of claim 17 wherein the instructions further cause the at least one processor to:
  acquire a pre-determined number of rotor bar number estimates;
  identify a rotor bar number that repeats the greatest number of times in the pre-determined number of rotor bar number estimates; and
  set the rotor bar number that repeats the greatest number of times as the reference rotor bar number, $R_{estimate}$.

19. The non-transitory computer readable storage medium of claim 18 wherein the instructions further cause the at least one processor to:
  associate a rotor bar number of the AC motor with the second estimate of the motor speed of the AC motor according to the frequency-domain based speed estimation algorithm;
  compare the rotor bar number determined from the frequency-domain based speed estimation algorithm with the reference rotor bar number, $R_{estimate}$; and
  if the rotor bar number determined from the frequency-domain based speed estimation algorithm is equal to the reference rotor bar number, $R_{estimate}$; then validate the second estimate of the motor speed of the AC motor.

20. The non-transitory computer readable storage medium of claim 16 wherein the motor NPI comprises a rated power, a rated speed, a rated frequency, and a rated voltage of the AC motor.

* * * * *